United States Patent
Maegawa et al.

(10) Patent No.: US 8,501,298 B2
(45) Date of Patent: Aug. 6, 2013

(54) RESIN-MOLDED ARTICLE

(75) Inventors: Akihito Maegawa, Yokkaichi (JP); Shinyu Nagashima, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 622 days.

(21) Appl. No.: 12/685,702

(22) Filed: Jan. 12, 2010

(65) Prior Publication Data

US 2010/0200264 A1 Aug. 12, 2010

(30) Foreign Application Priority Data

Feb. 6, 2009 (JP) ................... 2009-025990

(51) Int. Cl.
*H01R 13/46* (2006.01)
*H01R 13/50* (2006.01)

(52) U.S. Cl.
USPC ........... 428/120; 428/119; 428/156; 174/260; 174/261; 174/521; 174/523; 439/736

(58) Field of Classification Search
USPC .................. 428/119, 120, 156, 213; 174/260, 174/261, 262, 521, 523; 439/736; 264/318, 264/328.9, 328, 12
See application file for complete search history.

(56) References Cited

U.S. PATENT DOCUMENTS

2006/0281371 A1* 12/2006 Maegawa et al. ............. 439/736

FOREIGN PATENT DOCUMENTS

JP 2008-006722 1/2008

* cited by examiner

*Primary Examiner* — Maria Veronica Ewald
*Assistant Examiner* — Joanna Pleszczynska
(74) *Attorney, Agent, or Firm* — Gerald E. Hespos; Michael J. Porco; Matthew T. Hespos

(57) ABSTRACT

A resin-molded article 10 is formed by injecting molten resin into a molding die from a gate (11). Ribs (61, 62, 63 and 64) having widths larger than that of a thin molded portion (27) in the form of a thin wall are connected one after another from the position of the gate (11) to the thin molded portion (27). Spaces in the molding die for forming the ribs (61, 62, 63 and 64) define a path for the flow of the molten resin and the molten resin injected from the gate (11) flows into a space for forming the thin molded portion (27) through this path at the time of molding the resin-molded article (10). Therefore, the resin can be filled sufficiently for the thin molded portion (27) in the form of a thin wall located distant from the gate (11).

9 Claims, 5 Drawing Sheets

RESIN-MOLDED ARTICLE

BACKGROUND OF THE INVENTION

1. Field of the Invention

The invention relates to a resin molded article formed by injecting molten resin into a molding die from a gate.

2. Description of the Related Art

Japanese Unexamined Patent Publication No. 2008-6722 discloses a resin-molded article formed by injecting molten resin through a gate and into a molding die. The resin molded article requires a thin molded wall at a position distant from the gate. Additionally, this resin-molded article includes a primary molded article, which is an integral assembly of busbars and a primary molded portion. A secondary molded portion then unites the primary molded article with a metal plate. The resulting resin-molded article is long and has opposite longitudinal ends that project in the same direction. The gate is at a longitudinal intermediate position of the resin-molded article at a side opposite to the projecting direction of the opposite ends of the resin-molded article.

End portions of the busbars of the above-described resin-molded article are in the projecting parts at the opposite ends of the resin-molded article. These end portions of the busbars are partitioned by a partition wall that is formed during insert-molding of the secondary molded portion. The partition wall is thin and distant from the gate. Thus, the resin may not be filled insufficiently. An increased injection pressure conceivably could address this problem, but can cause a problem of burrs. Therefore, countermeasures have been asked for.

The invention was developed in view of the above situation and an object thereof is to enable resin to be sufficiently filled for a thin molded portion in the form of a thin wall located distant from a gate.

SUMMARY OF THE INVENTION

The invention there relates to a resin molded article formed by injecting molten resin through a gate and into a molding die. The resin molded article includes at least one thin molded wall. Ribs are connected one after another from the position of the gate to the thin molded wall and are wider than the thin molded wall. Accordingly, spaces in the molding die for forming the ribs define a path for the flow of the molten resin and the molten resin injected from the gate may flow through this path and into a space for forming the thin molded wall. Therefore, the resin sufficiently fills the thin molded wall located distant from the gate.

Connected parts of the ribs with the thin molded wall may have contact surfaces at an angle to the gate. Accordingly, the molten resin contacts a wall surface of the molding die for forming the contact surface of the rib and flows toward the space for forming the thin molded wall. Thus, the resin can be filled sufficiently for the thin molded wall.

A thinned portion may be formed in an area bounded by the ribs.

The ribs may include a first rib that extends from the gate to an intermediate position between the gate and a side wall. A width of the first rib preferably exceeds the thickness of the thin molded wall and may be substantially constant along the entire length direction of the first rib.

A second rib adjacent to the first rib may have a substantially pointed, converging or triangular shape with a width that gradually decreases from the first rib toward an end of the second rib substantially opposite to the first rib. The end of the second rib substantially opposite to the first rib preferably is at a position substantially aligned with the center of a fixing hole in the longitudinal direction of the resin-molded article.

A third rib may extend substantially straight from the second rib toward the side wall substantially along a vertical lateral edge of the second rib. The third rib preferably is arranged at an angle to the side wall and preferably has a substantially constant width substantially equal to the width of the first rib.

A fourth rib may be provided and may have a substantially constant width along its length. The width of the fourth rib preferably exceeds the widths of the first and third ribs.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

A resin-molded article in accordance with the invention is identified by the numeral 10 in FIGS. 1 to 5. The resin molded article 10 in this embodiment is a sensor unit to be installed in a transmission of an automotive vehicle and is formed by injecting molten resin into an unillustrated molding die from gates 11.

Figure 1:
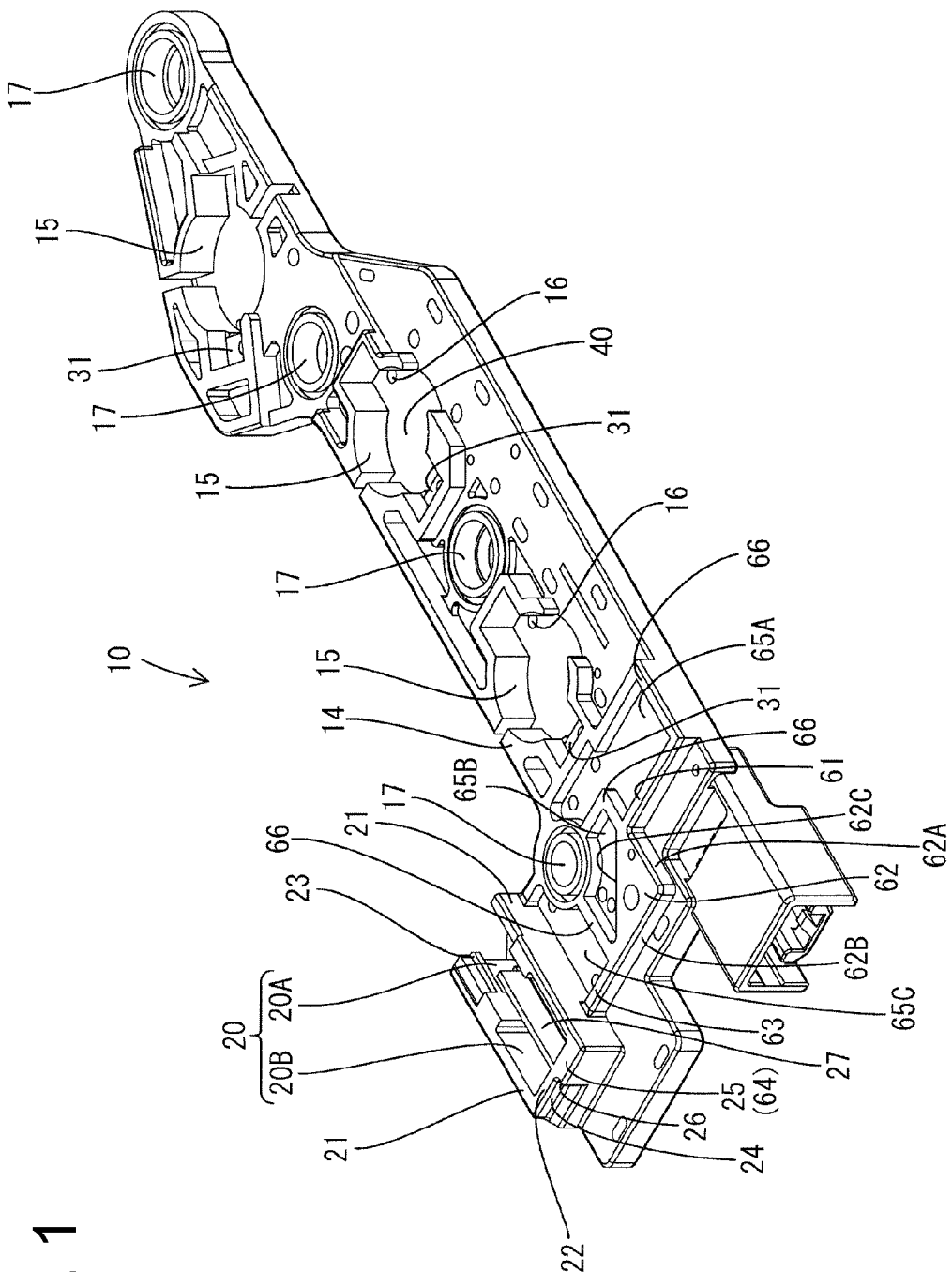
FIG. 1 is an external perspective view of a resin-molded article according to one embodiment.

The resin-molded article 10 has a long shape with opposite longitudinal end portions that project in substantially the same direction. In the following description, a side toward which the opposite end portions of the resin-molded article 10 project and an opposite side are referred to respectively as upper and lower sides. Upper and lower sides of FIG. 1 are referred to respectively to as front and back sides.

The resin-molded article 10 has a primary molded article 13 that is an integral assembly of busbars 30 and a primary molded portion 12 that defines a unitary matrix of resin that surrounds and engages portions of the busbars 30. The primary molded article 13 is united with a long conductive (preferably metal) plate 40 by insert-molding a secondary molded portion 14 so that the conductive plate 40 is on the back side of the resin-molded article 10. Thus, the secondary molded portion 14 defines a unitary matrix of resin that surround and engages at least parts of the primary molded portion 12 and the plate 40.

Figure 2:
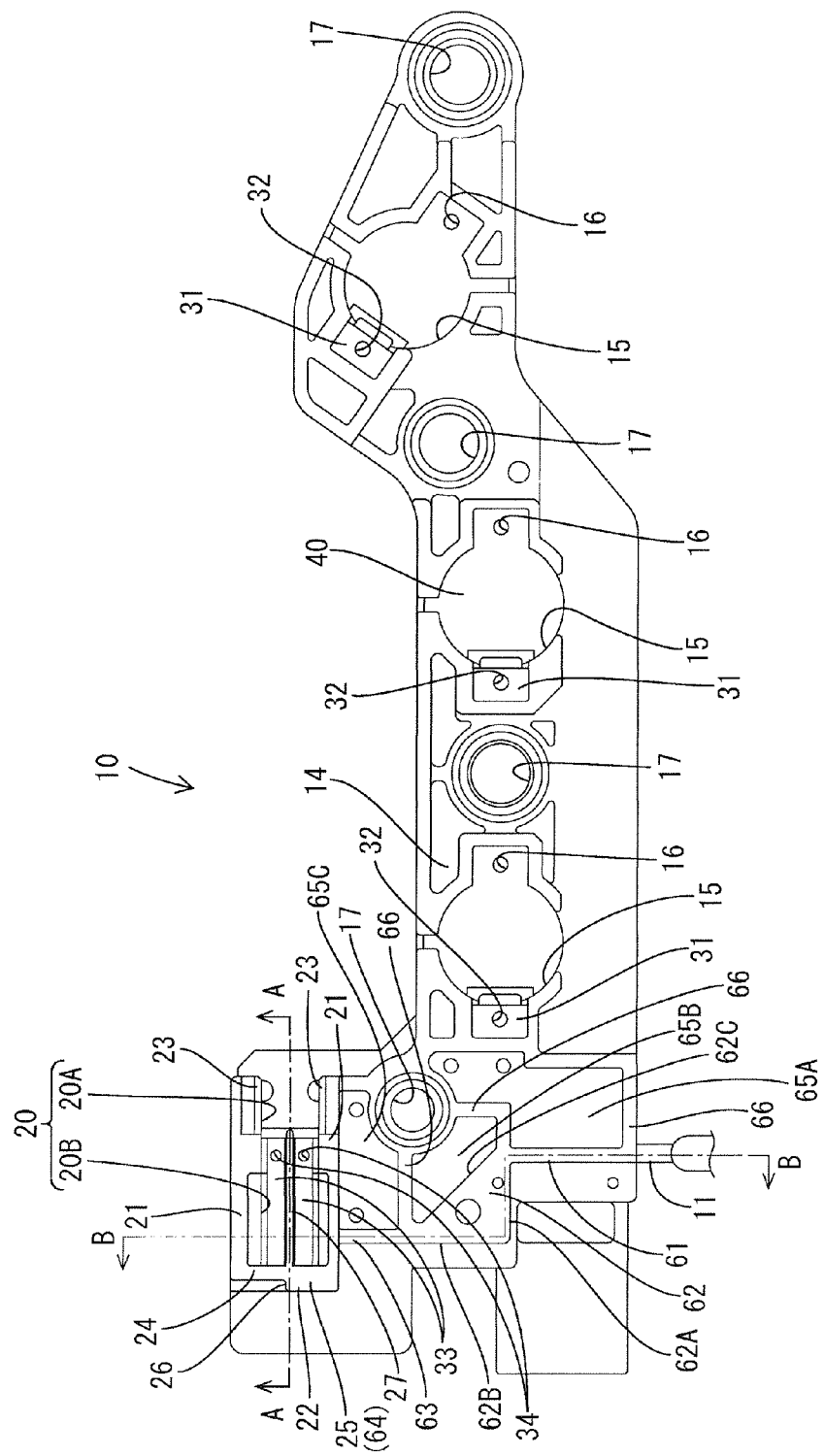
FIG. 2 is a plan view of the resin-molded article.
Figure 3:
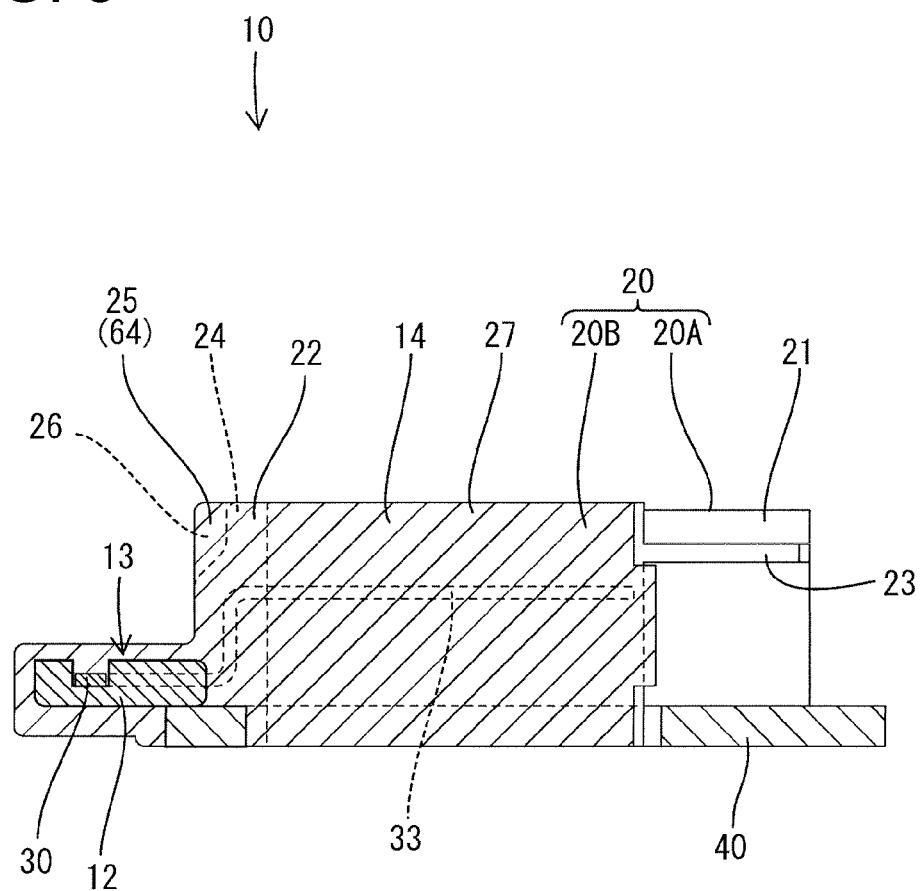
FIG. 3 is a section along A-A of FIG. 2.

Gates preferably are set at a plurality of positions, and include a gate 11 set on the lower surface of the resin-molded article 10 (see FIG. 2). The gate 11 is provided at one of the opposite end portions of the resin-molded article 10 and is arranged substantially perpendicular to the lower surface of the resin-molded article 10.

Mounting portions 15 are provided at three positions on the resin-molded article 10 for receiving unillustrated oil pressure switches. The mounting portions 15 are arranged at specified intervals in a longitudinal direction of the resin-molded article 10, and one of mounting portion 15 is at the longitudinal end portion of the resin-molded article 10 opposite the sensor mounting portion 20. The mounting portions 15 penetrate the secondary molded portion 14 in a front-back direction and the conductive plate 40 is exposed at the mounting portions 15. The oil pressure switches mounted in the mounting portions 15 are placed on the front surface of the conductive plate 40. Connection holes 16 are formed in parts of the conductive plate 40 exposed through the mounting portions 15 and terminals of the oil pressure switches are fixed (e.g. riveted) at the connection holes 16.

Fixing holes 17 penetrate the resin-molded article 10 at four positions for fixing the resin-molded article 10 to an unillustrated mating member. The fixing holes 17 are arranged at substantially opposite longitudinal end positions of the resin-molded article 10 and at positions between the mounting portions 15.

The sensor mounting portion 20 is provided at one longitudinal end of the resin-molded article 10 and is configured so that an oil temperature sensor 50 can be mounted therein. The sensor mounting portion 20 is provided at an upper end portion in a shorter-side direction of the resin-molded article 10 (leading end portion in the projecting direction) and is longer in the longitudinal direction of the resin-molded article 10. The sensor mounting portion 20 is open at one longitudinal end thereof. The conductive plate 40 is arranged at the back side sensor mounting portion 20 but is exposed to the front side.

The sensor mounting portion 20 has two side walls 21 that face each other in the shorter-side direction of the resin-molded article 10 and a back wall 22 that extends between the side walls 21 at an end opposite the open end of the sensor mounting portion 20. A main-body mounting portion 20A is defined at the open end of the sensor mounting portion 20 and can receive a main body 52 of the oil temperature sensor 50. A terminal connecting portion 20B is defined at the back wall 22 of the sensor mounting portion 20 and terminals of the oil temperature sensor 50 can be connected with the busbars 30 at the terminal connecting portion 20B.

Two engaging projections 23 are provided in the side walls 21 of the main-body mounting portion 20A. The engaging projections 23 project in substantially facing directions on the side walls 21 and extend in an opening direction of the sensor mounting portion 20.

Figure 4:
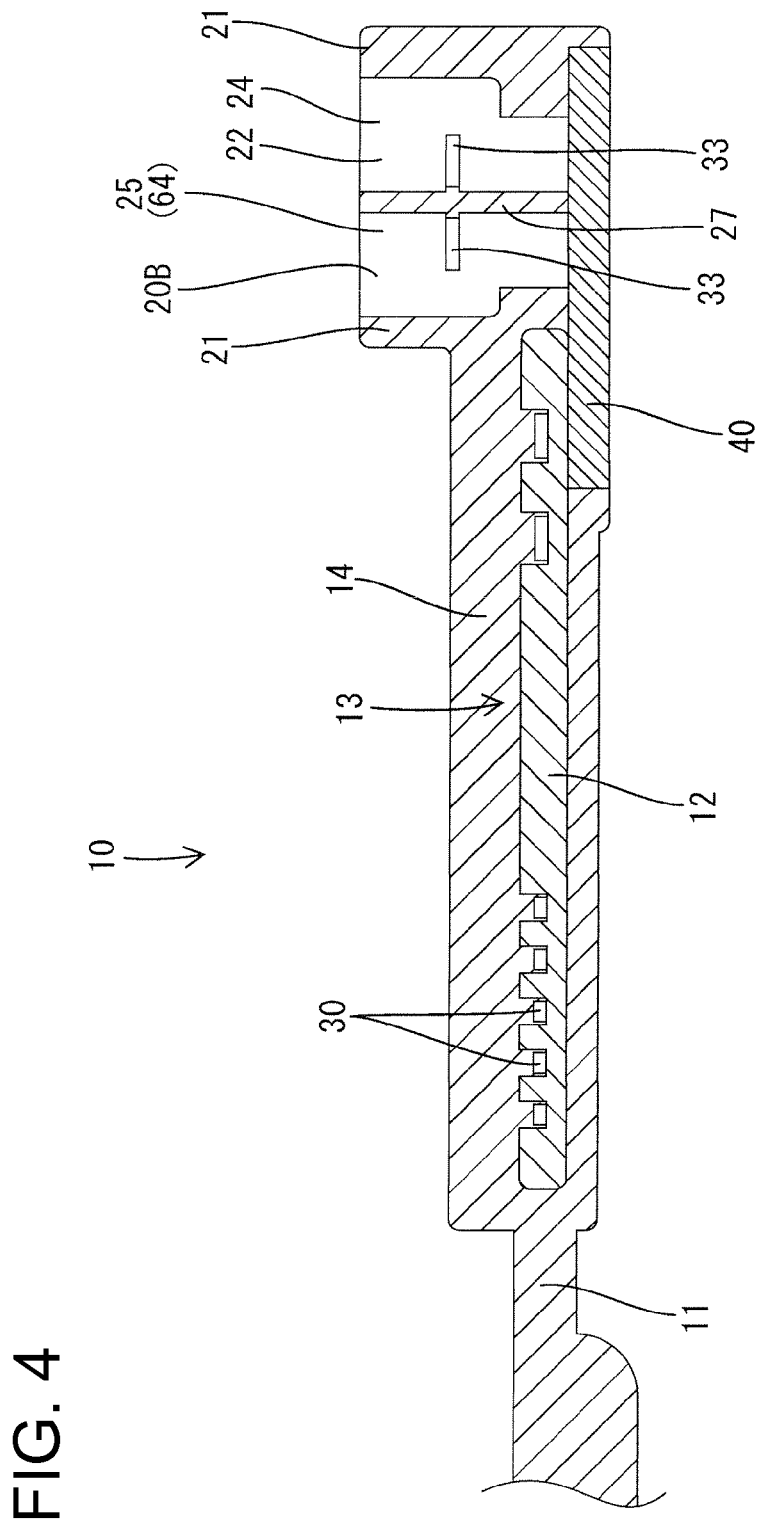
FIG. 4 is a section along B-B of FIG. 2.

Parts of the side walls 21 that form the terminal connecting portion 20B are thicker at the back side than at the front side (see FIG. 4).

Approximately an upper half of the back wall 22 is thinner than the lower part of the back wall 22, as shown most clearly in FIGS. 1 and 2. These different thickness portions of the back wall 22 are referred to herein as a thin wall portion 24 and a thick wall portion 25. Additionally, the thin wall portion 24 is thinner at the front than at the rear, and an intermediate part of the thin wall portion 24 in the front-back direction is tapered continuously or stepwise toward the front, as shown in FIG. 1.

The thick wall portion 25 has a substantially constant thickness in the front-back direction that is substantially equal to the maximum thickness at the back part of the thin wall portion 24. A partition wall 27 extends in the longitudinal direction of the resin-molded article 10 at a position between the side walls 21 and is joined to the back wall 22 at a position where the thick wall portion 25 meets the thin wall portion 24. A contact surface 26 is formed on a side of the back wall 22 opposite the partition wall 27 and at the end of the thick wall portion 25 adjacent the thin wall portion 26. The contact surface 26 is substantially trapezoidal when viewed vertically. The contact surface 26 is at substantially the same position as the upper surface of the partition wall 27, is substantially parallel with the side walls 21 and is substantially perpendicular to the gate 11.

The partition wall 27 partitions the terminal connecting portion 20B of the sensor mounting portion 20. However, the main-body mounting portion 20A of the sensor mounting portion 20 forms one space and is not partitioned by the partition wall 27. The partition wall 27 is substantially parallel to the side walls 21 and substantially perpendicular to the back wall 22.

The partition wall 27 is thinner than the front parts of the areas of the side walls 21 that form the terminal connecting portion 20B and thinner than the front part of the thin wall portion 24 of the back wall 22. The height of the partition wall 27 (dimension parallel with the front-back direction) is substantially equal to heights of the side walls 21 and the back wall 22. The height of the partition wall 27 is larger than the width (dimension parallel with the longitudinal direction of the resin-molded article 10). Wall surfaces of the partition wall 27 are substantially perpendicular to the gate 11, and an end of the partition wall 27 toward the open side of the sensor mounting portion 20 is located in front of the gate 11.

The side walls 21, the back wall 22 and the partition wall 27 of the sensor mounting portion 20 form a part of the secondary molded portion 14.

Each busbar 30 is formed by bending, folding and/or embossing a plate material, which is obtained by punching out, cutting or stamping a substantially flat electrically conductive plate into a specified shape. Ends of all the busbars 30 at least on one side preferably are collected at one longitudinal end portion of the resin-molded article 10 and project from the resin-molded article 10. The other ends of the busbars 30 define first connecting portions 31 and project into the mounting portions 15. First connection holes 32 penetrate the first connecting portions 31 and terminals of the oil pressure switches can be fixed (preferably riveted) to the first connection holes 32. Ends of the other busbars 30 define second connecting portions 33 that project into the terminal connecting portion 20B of the sensor mounting portion 20. Each of the second connecting portions 33 is arranged in the corresponding partitioned section of the space of the terminal connecting portion 20B. Second connection holes 34 penetrate the second connecting portions 33 and terminals of the oil temperature sensor are fixed (preferably riveted) to the second connection holes 34.

Figure 5:
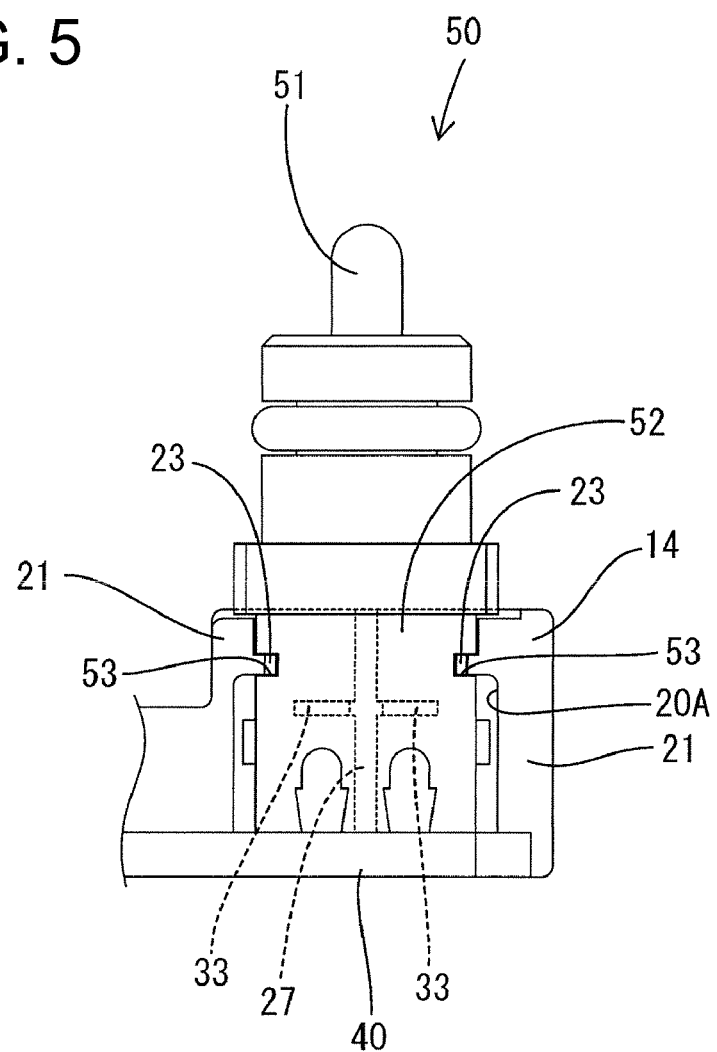
FIG. 5 is a partial enlarged side view showing a state where an oil temperature sensor is mounted.

The oil temperature sensor 50 includes a main body 52 with a thermosensitive portion 51 where an unillustrated thermistor is embedded or fixed, and terminals project from the main body 52 (see FIG. 5). A part of the main body 52 opposite the thermosensitive portion 51 defines a block that can fit into the main-body mounting portion 20A of the sensor mounting portion 20. Engaging grooves 53 are formed in side surfaces of the main body 52 and engage with the respective engaging projections 23 of the main-body mounting portion 20A to guide the oil temperature sensor 50 into the main-body mounting portion 20A of the sensor mounting portion 20, and to hold the oil temperature sensor 50 at a specified position while being mounted in the sensor mounting portion 20. The terminals project sideways from the main body 52 and are placed respectively on the second connecting portions 33 of the busbars 30 arranged in the terminal connecting portions 20B in substantially the front-back direction.

First through fourth ribs 61, 62, 63 and 64 project from the front surface of the resin-molded article 10 and connected one after another between the position of the gate 11 and the partition wall 27. More particularly, the first rib 61 extends substantially perpendicularly up from the lower surface of the resin-molded article 10 at a position aligned with the gate 11. The second rib 62 extends from the first rib 61 to a position approximately halfway toward the side wall 21 of the sensor mounting portion 20. The third rib 63 extends from the second rib 62 to the side wall 21 of the sensor mounting portion 20. The fourth rib 64 extends from the side wall 21 to the partition wall 27. Projecting distances of the first, second and third ribs 61, 62 and 63 preferably are entirely constant.

The first rib 61 has a length to extend up to a substantially midpoint between the position of the gate 11 and the side wall 21. The first rib 61 has a substantially constant width that is wider than the thickness of the partition wall 27.

The second rib 62 preferably has a converging or triangular shape with a width in a direction parallel to the longitudinal direction of the resin-molded article 10 that gradually decreases from the first rib 61 toward the third rib 63. An end of the second rib 62 opposite the first rib 61 is aligned substantially with the center of the closest fixing hole 17 in the longitudinal direction of the resin-molded article 10.

The second rib 62 has a lateral edge 62A extending substantially perpendicularly to the first rib 61 from an end of the first rib 61 nearest the side wall 21 toward the one longitudinal end of the resin-molded article 10, a vertical edge 62B extending substantially parallel to the first rib 61 from the leading end of the lateral edge 62A toward the side wall 21 and an inclined edge 62C extending obliquely from a position above the upper end of the first rib 61 toward the side wall 21 in a direction to gradually approach the vertical lateral edge 62B. An end of the inclined edge 62C toward the first rib 61 is located in front of the gate 11.

The third rib 63 extends substantially straight from the upper end of the second rib 62 toward the side wall 21 along the vertical lateral edge 62B of the second rib 62. The third rib 63 is substantially perpendicular to the side walls 21 of the sensor mounting portion 20. The width of the third rib 63 in a direction parallel to the longitudinal direction of the resin-molded article 10 is substantially constant and equal to the width of the first rib 61.

The fourth rib 64 forms a part of the back wall 22 of the sensor mounting portion 20 and corresponds to the thick portion 25 of the back wall 22. The width of the fourth rib 64 in a direction along the longitudinal direction of the resin-molded article 10 exceeds the widths of the first and third ribs 61, 63 and is substantially constant over the entire length.

Reinforcing ribs 66 are provided on the front surface of the resin-molded article 10. One of the reinforcing ribs 66 extends substantially along the lower surface from the position of the gate 11, is bent substantially perpendicular to the lower surface of the resin-molded article 10 after and has a leading end portion branched off in a plurality of directions. Another reinforcing rib 66 extends substantially perpendicular to the first rib 61 from a connected part of the first and second ribs 61, 62 and then is bent at a substantially right angle to extend toward the fixing hole 17. Still another reinforcing rib 66 extends substantially perpendicular to the third rib 63 from a connected part of the second and third ribs 62, 63 toward the fixing hole 17. The reinforcing ribs 66 have widths equal to widths of the first and third ribs 61, 63.

Thinned portions 65 are formed in the front surface of the resin-molded article 10 leaving the first, second and third ribs 61, 62 and 63 as they are. The thinned portions 65 are formed at a plurality of positions and include a first thinned portion 65A surrounded by the first rib 61 and the reinforcing ribs 66, a second thinned portion 65B surrounded by the second rib 62 and the reinforcing ribs 66 and a third thinned portion 65C at least partly surrounded by the third rib 63, the reinforcing ribs 66 and the side wall 21 of the sensor mounting portion 20.

The primary molded article 13 and the conductive plate 40 are set in a lower part of the unillustrated molding die, and molten resin is injected from the gate 11 after the molding die is closed. Spaces for forming the first, second, third and fourth ribs 61, 62, 63 and 64 in the molding die define a path for the flow of the molten resin. Thus, the molten resin injected from the gate 11 flows through this path and into a space for forming the partition wall 27. The molten resin that flows into the space for forming the fourth rib 64 contacts a wall surface of the molding die for forming the contact surface 26 of the fourth rib 64, and flows into the space for forming the partition wall 27. The molding die is opened after the filling of the molten resin is completed, and the resin-molded article 10 in which the primary molded article 13 and the conductive plate 40 are united by the secondary molded portion 14 can be taken out.

The first, second, third and fourth ribs 61, 62, 63 and 64 of the resin-molded article 10 are wider than the partition wall 27 and are connected one after another from the position of the gate 11 to the thin partition wall 27. Thus, the spaces in the molding die for forming the first, second, third and fourth ribs 61, 62, 63 and 64 define a path for the flow of the molten resin, and molten resin injected from the gate 11 flows efficiently through this path and into the space for forming the thin partition wall 27 located distant from the gate 11.

A connected part of the fourth rib 64 with the partition wall 27 has a contact surface 26 at an angle that preferably is between about 70° and about 110°, more preferably substantially perpendicular to the gate 11. Thus, the molten resin contacts the wall surface of the molding die for forming the contact surface and flows toward the space for forming the partition wall 27. Therefore the resin for the partition wall 27 can be filled sufficiently.

The first, second and third thinned portions 65A, 65B and 65C are defined inwardly of the first, second and third ribs 61, 62 and 63 to prevent sink formation in the secondary molded portion 14 more effectively than if the thickness of the secondary molded portion in the front-back direction is increased entirely over a wide range (range including the first, second and third thinned portions 65A, 65B and 65C) from the gate 11 to the partition wall 27 without a thinned portion.

The invention is not limited to the above described and illustrated embodiment. For example, the following embodiments are also included in the technical scope of the present invention.

Although the resin-molded article 10 is the sensor unit installed in the transmission of an automotive vehicle in the above embodiment, the invention can be applied to any resin-molded article formed by injecting molten resin into a molding die from a gate.

The resin-molded article 10 is formed by insert-molding the busbars 30 and the conductive plate 40 in the above embodiment. However, a resin-molded article may be formed by insert-molding only busbars or only a conductive plate or any other insert element or may be made only of a resin.

What is claimed is:

1. A resin-molded article, comprising:
opposite upper and lower surfaces;
at least one thin wall spaced from the lower surface and substantially parallel to the lower surface, the thin wall having a selected thickness; and
ribs connected one after another from the lower surface to the upper surface, the ribs each having widths that exceed the selected thickness of the thin wall, the ribs including an upper rib closest to the upper surface of the resin-molded article, the upper rib including an upper section extending between an end of the thin wall and the upper surface of the resin-molded article and a lower section extending from the end of the thin wall in a direction away from the upper surface of the resin-molded article, the upper section of the upper rib being thinner than the lower section thereof so that a contact surface is defined in the upper rib at a side of the thin wall closer to the upper surface of the resin-molded article, whereby the contact surface assures an efficient flow of resin along the ribs and into the thin wall.

2. The resin-molded article of claim 1, wherein the contact surface defines a step aligned substantially parallel to the lower surface.

3. The resin-molded article of claim 1, wherein at least one thinned portion is formed on the resin molded article at a location surrounded at least partly by the ribs.

4. The resin-molded article of claim 1, wherein the ribs include a first rib with a length extending to an intermediate position between the upper and lower surface of the resin-molded article, the width of the first rib being substantially constant along an entire length thereof.

5. The resin-molded article of claim 4, wherein the ribs include a second rib adjacent to the first rib, the second rib having a substantially converging shape with a width gradually decreasing from the first rib toward an end of the second rib substantially opposite to the first rib.

6. The resin-molded article of claim 5, wherein the end of the second rib substantially opposite to the first rib is at a position substantially aligned with a fixing hole in the longitudinal direction of the resin-molded article.

7. The resin-molded article of claim 5, wherein the ribs include a third rib extending substantially straight from a vertical lateral edge of the second rib, wherein the third rib being arranged at an angle to a side wall extending substantially parallel to the thin wall.

8. The resin-molded article of claim 7, wherein the width of the third rib is substantially equal to the width of the first rib and is substantially constant over the entire length thereof.

9. The resin-molded article of claim 8, wherein the upper rib has a width exceeding the widths of the first and third ribs and being substantially constant from the third rib to the side wall.

* * * * *